(12) United States Patent
Liu

(10) Patent No.: US 9,380,801 B2
(45) Date of Patent: Jul. 5, 2016

(54) CHEWING GUM AND GUM BASES CONTAINING HIGHLY SUBSTITUTED STARCH SHORT CHAIN CARBOXYLATES

(75) Inventor: Jingping Liu, Chicago, IL (US)

(73) Assignee: Wm. Wrigley Jr. Company, Chicago, IL (US)

( * ) Notice: Subject to any disclaimer, the term of this patent is extended or adjusted under 35 U.S.C. 154(b) by 242 days.

(21) Appl. No.: 13/140,619

(22) PCT Filed: Dec. 18, 2009

(86) PCT No.: PCT/US2009/068719
§ 371 (c)(1),
(2), (4) Date: Jul. 13, 2011

(87) PCT Pub. No.: WO2010/080612
PCT Pub. Date: Jul. 15, 2010

(65) Prior Publication Data
US 2011/0262586 A1 Oct. 27, 2011

Related U.S. Application Data

(60) Provisional application No. 61/138,781, filed on Dec. 18, 2008.

(51) Int. Cl.
*A23G 4/08* (2006.01)
(52) U.S. Cl.
CPC ........................................ *A23G 4/08* (2013.01)
(58) Field of Classification Search
CPC .................................. A23G 4/08; C08B 31/04
USPC .................................... 426/3, 6; 536/110, 123
See application file for complete search history.

(56) References Cited

U.S. PATENT DOCUMENTS

| 3,666,492 A | | 5/1972 | Teng | |
|---|---|---|---|---|
| 3,883,666 A | | 5/1975 | Teng | |
| 4,035,572 A | | 7/1977 | Stubits | |
| 4,041,179 A | | 8/1977 | Stubits | |
| 5,587,412 A | * | 12/1996 | Borchers et al. | 524/47 |
| 5,589,577 A | * | 12/1996 | Peltonen et al. | 536/22.1 |
| 5,714,601 A | * | 2/1998 | Tanaka et al. | 536/107 |
| 6,369,215 B1 | * | 4/2002 | Peltonen et al. | 536/108 |
| 6,495,679 B1 | * | 12/2002 | Tanaka | 536/107 |
| 6,617,449 B2 | * | 9/2003 | Tanaka | 536/123 |
| 2004/0166197 A1 | | 8/2004 | Ribadeau-Dumas | |

FOREIGN PATENT DOCUMENTS

| CN | 101069539 A | * | 11/2007 |
|---|---|---|---|
| FR | 2927083 A1 | | 7/2009 |
| WO | 2009150385 A2 | | 12/2009 |

OTHER PUBLICATIONS

Preparation of Long-Chain Esters of Starch Using Fatty Acid Chlorides in the Absence of an Organic Solvent, Aburto, et al, Starch/Starke 51 (1999) Nr. 4, S. 132-135.
Synthesis of Higher Fatty Acid Starch Esters using Vinyl Laurate and Stearate as Reactants, Junista, et al, Starch/Stärke 60 (2008) 667-675.
Synthesis and Properties of Starch Based Biomaterials, Sugih, PhD Dissertation at U. Groningen.
Almeida, et al., "Deformation of isotropic and anisotropic liquid droplets dispersed in a cellulose liquid crystalline derivative," Cellulose, 2009, vol. 16, pp. 427-434.
Xu, et al., "Synthesis and Characterization of Starch Acetates with High Substitution," Cereal Chemistry, 81(6), pp. 735-740 (2004).

* cited by examiner

*Primary Examiner* — Nikki H Dees
(74) *Attorney, Agent, or Firm* — Armstrong Teasdale LLP

(57) ABSTRACT

A chewing gum base which is cud-forming and chewable at mouth temperature contains water-insoluble highly substituted starch short chain carboxylate. The highly substituted starch short chain carboxylate may be plasticized to function as an elastomer in the gum base.

21 Claims, 1 Drawing Sheet

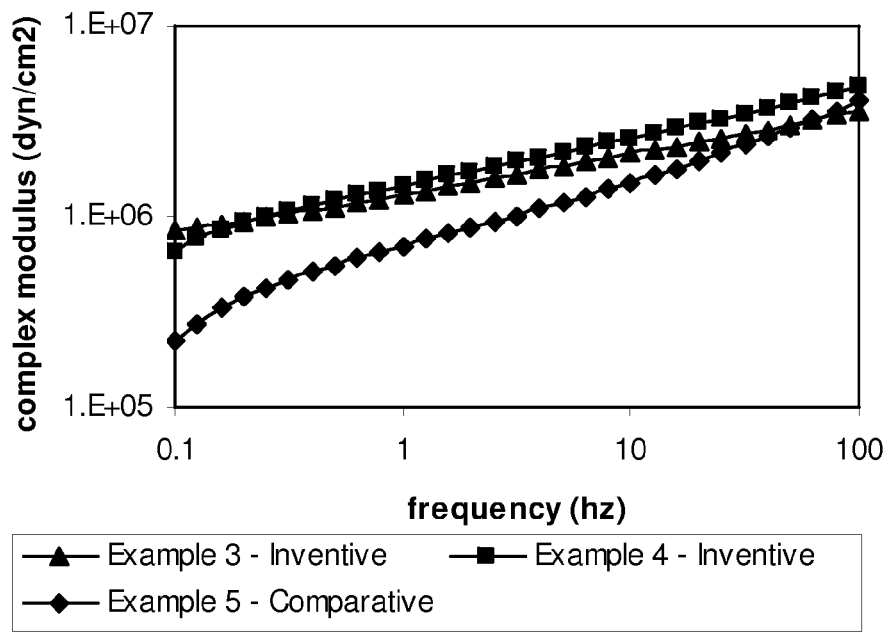
Figure 1: Rheological Properties of Chewed Gum Cuds 0.5% Strain
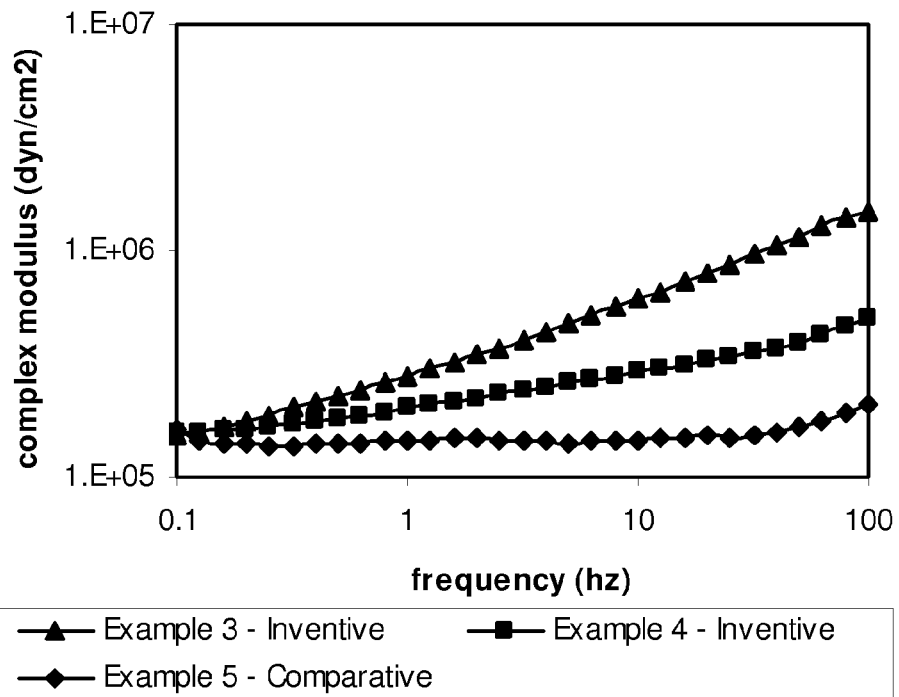
Figure 2: Rheological Properties of Chewed Gum Cuds 10% Strain

CHEWING GUM AND GUM BASES CONTAINING HIGHLY SUBSTITUTED STARCH SHORT CHAIN CARBOXYLATES

CROSS-REFERENCE TO RELATED APPLICATIONS

This application is a 35 U.S.C. §371 national stage application of PCT/US2009/068719, filed Dec. 18, 2009, and additionally claims priority to U.S. Provisional Application No. 61/138,781, filed Dec. 18, 2008.

BACKGROUND OF THE INVENTION

The present invention relates to chewing gum. More specifically, this invention relates to improved formulations for chewing gum bases and chewing gum containing highly substituted starch short chain carboxylates.

Primary components of a chewing gum typically are a water-insoluble gum base portion and a water-soluble bulking agent portion typically including a bulking agent together with minor amounts of secondary components such as flavors, colorants, water-soluble softeners, gum emulsifiers, acidulants and sensates. Typically, the water-soluble portion, sensates, and flavors dissipate during chewing and the gum base is retained in the mouth throughout the chew.

Water-insoluble gum base typically includes elastomers, elastomer solvents, softeners/emulsifiers (including fats, oils, waxes, mono- and di-glycerides), and fillers. Elastomers commonly used in gum bases are synthetic elastomers such as polyisobutylene, isobutylene-isoprene copolymers ("butyl rubber"), conventional styrene-butadiene copolymers, polyisoprene, and combinations thereof. Also, natural elastomers such as natural rubbers can be used.

Because the elastomer is an important functional component of a gum base, the characteristics of such elastomers have a significant impact on characteristics of a chewing gum composition, especially regarding those properties important to consumer acceptance. Among properties important to consumers are odor, taste, chewing properties, and mouthfeel, including the ability of a gum composition to form a cud while chewing. Furthermore, physical characteristics of the elastomer affect processibility of a gum base and of a chewing gum formulation including the gum base.

Chewing gums were originally formulated with natural gums, primarily jelutong and chicle, which were obtained by tapping rainforest rubber trees. Due to fluctuating supply and price of the natural products and increasing demand for chewing gum products, these rubbers have largely been replaced by synthetic elastomers. The elastomer most widely used currently in chewing gum is butyl rubber due to consumer acceptance of chewing properties of the resulting chewing gum product and the lack of objectionable odor or taste associated with butyl rubber. Polyisobutylene (FIB) is another elastomer frequently used in gum bases. Lower molecular weight (below 100,000 viscosity average) PIB improves compatibility of base components, modifies elasticity and softens the chewing characteristics of gum bases to which it is added. However, it is not generally usable as the sole elastomer in a gum base formula. Higher molecular weight (at least 100,000 viscosity average) PIB acts more like butyl rubber, but its use is less common. Styrene butadiene copolymer rubber (SBR) has been used successfully as an elastomer in gum products, particularly bubblegums.

The above elastomers are normally derived from a petroleum feedstock and processed to food-grade standards. Recently, consumers have expressed preference for more natural foods and a desire to minimize use of products derived from petroleum. Additionally, due to fluctuations in the price and supply of petroleum, continued availability of these food-grade elastomers has become uncertain. While some non-petroleum derived elastomers have been proposed, problems with cost, supply, texture, flavor or the use of potentially toxic solvents and reagents have precluded widespread implementation of these alternative elastomers. In this regard, it is desirable to find an inexpensive, readily available, consumer-acceptable gum base elastomer which is derived from a natural food ingredient and processed without using potentially toxic solvents and reagents.

Starch is a natural product derived from plants such as corn, arrowroot, potatoes, sago and tapioca. Starch is a polysaccharide carbohydrate with a chemical formula $(C_6H_{10}O_5)_n$, (where n is typically in the range of 200 to 600,000) consisting of a large number of anhydroglucose monosaccharide units joined together by glycoside bonds. All plant seeds and tubers contain starch which is predominantly present as amylose and amylopectin. Chemical derivatives of starch are known such as starch acetate which typically is formed by esterification of starch with acetic anhydride. Unmodified starch or conventional starch acetates are unsuitable for use in a gum base because they lack elastomeric properties and hydrophobicity required for a suitable gum base.

This invention is directed to gum bases containing plasticized short chain alkanoates of starch having a high degree of substitution and to consumer-acceptable chewing gum formulations containing such gum bases.

SUMMARY OF THE INVENTION

A chewing gum contains a water-insoluble gum base portion containing a plasticized highly substituted starch short chain carboxylate which is cud-forming and chewable at mouth temperature.

DESCRIPTION OF THE DRAWINGS

These and other features, aspects and advantages of the present invention will become better understood when the following detailed description is read with reference to the accompanying drawings wherein:

FIG. 1 shows a rheology profile of chewed gum cuds of the present invention and a comparative example at 0.5% strain; and FIG. 2 shows a rheology profile of chewed gum cuds of the present invention and a comparative example at 10% strain.

DESCRIPTION OF THE INVENTION

The present invention provides improved chewing gum formulations and chewing gum bases, as well as methods of producing chewing gum and chewing gum bases. In accordance with the present invention, chewing gum is provided that includes a highly substituted starch short chain carboxylate (HSSSCC). Plasticized HSSSCCs are used in gum base formulations to function as an elastomer. In various preferred embodiments, HSSSCCs are combined with a compatible plasticizer and added to gum formulations as a complete or partial replacement of petroleum-based elastomers.

A variety of gum base and chewing gum formulations including HSSSCCs can be created and/or used in accordance with the present invention. The base formulations of the present invention may be conventional bases that include wax or are wax-free, tacky or non-tacky. The gum formulations can be low or high moisture formulations containing low or high amounts of moisture-containing syrup. HSSSCCs can be used in sugar-containing chewing gums and also in low sugar and non-sugar containing gum formulations made with sorbitol, mannitol, other polyols, and non-sugar carbohydrates. Non-sugar formulations can include low or high moisture sugar-free chewing gums.

In various preferred embodiments, plasticized HSSSCC may be used as the sole elastomer or it may be is combined with other base elastomers for use in chewing gum base. Such other elastomers, where used, include synthetic elastomers including polyisobutylene, isobutylene-isoprene copolymers, styrene-butadiene copolymers, polyisoprene, and combinations thereof. Natural elastomers that can be used include natural rubbers such as chicle. However, it is preferred that the plasticized HSSSCCs completely replace the petroleum-derived elastomers normally used in conventional gum bases.

In preferred embodiments of this invention, HSSSCCs are combined with a compatible plasticizer to provide a plasticized elastomer material which is consistent with the chew properties of conventional, petroleum-based elastomers. These materials typically are elastomeric at body temperature in the sense of having an ability to be stretched to at least twice of an original length and to return to substantially such original length (such as no more than 150%, preferably no more than 125% of the original length) upon release of stress.

In some embodiments, the plasticized HSSSCC will be the sole component of the insoluble gum base. In other embodiments, the plasticized HSSSCC will be combined with softeners, fillers, colors, antioxidants and other conventional, non-elastomeric gum base components. In some embodiments, the HSSSCC gum bases may be used to replace conventional gum bases in chewing gum formulas which additionally contain water-soluble bulking agents, flavors, high-intensity sweeteners, colors and other optional ingredients. These chewing gums may be formed into sticks, tabs, tapes, coated or uncoated pellets or balls or any other desired form. By substituting the plasticized HSSSCCs of the present invention for conventional gum base elastomers safe, economical, consumer-acceptable chewing gum products can be manufactured without using petroleum-derived ingredients of potentially uncertain availability.

The HSSSCC, when used according to the present invention, affords the chewing gum excellent texture, shelf life and flavor quality. Because plasticized HSSSCCs have chewing properties similar to other elastomers in most respects, gum bases containing plasticized HSSSCCs create a resultant chewing gum product that has a high consumer-acceptability.

The present invention provides in some embodiments an improved chewing gum formulation, improved shelf life, and improved flavor quality.

Additional features and advantages of the present invention are described in, and will be apparent from, the detailed description of the presently preferred embodiments.

Starch is a naturally occurring component in seeds and roots of edible plants. Chemically, it is a water soluble polysaccharide composed of thousands of glucose units. The glucose units may be linked in one of two ways to produce either amylose or amylopectin. Starches of varying molecular weight and ratios of amylose to amylopectin are available. The characteristics of a starch, its molecular weight and ratio of amylose to amylopectin are primarily determined by the source of the starch, i.e. the plant from which it is derived. However, it is possible to modify these characteristics chemically for example by reacting the starch with acids or enzymes to reduce its molecular weight.

Starch can be reacted with monofunctional carboxylic acids or their anhydrides, vinyl alkanoates or fatty acid chlorides to replace some of the hydroxyl units on the glucose molecule with carboxylic acid groups joined through ester linkages. These modified starches are known as starch carboxylates. An alkyl carboxylic acid ester modified starch is a starch alkanoate. For example, starch may be reacted with acetic acid, acetic anhydride or vinylacetate to produce starch acetate. Generally, reactions with anyhydrides are preferred to minimize water formation in the reaction which tends to impede further reaction making it difficult to produce higher DS starch carboxylates. A basic catalyst such as sodium hydroxide may also be added to remove the acid produced in the reaction. The conditions of this reaction—time, temperature, ratio of reagents, pH—can be varied to produce different percentages of replacement of the hydroxyl units with short chain alkyl groups joined through ester linkages. This is normally characterized as the degree of substitution (DS) which is a number reflecting the average number of hydroxyl groups per glucose molecule which are replaced in the modification. For example, starch acetate with a DS of 1.0 would have an average of one hydroxyl group replaced by an acetate group on each glucose unit. Commercially available starch carboxylates (typically starch acetates) have a low DS, typically well below 0.10. However, it is theoretically possible to produce starch carboxylates having DS up to 3.0, this representing the replacement of all hydroxyl groups.

As DS increases, the resulting molecule becomes less water soluble in its amorphous state and less hydrophilic. Starch carboxylates having DS of 0.5 are still significantly water soluble but starch carboxylates of sufficiently high DS are essentially water insoluble.

For purposes of the present invention, highly substituted starch short chain carboxylates (such as alkanoates, alkenoates and formate) are starch carboxylates (preferably alkanoates) with sufficiently high DS to be essentially water insoluble and which are capable of forming a cud when incorporated into a chewing gum formulation and chewed. In an embodiment, the amorphous HSSSCCs of the present invention have a water solubility of less than 1% at 35° C. In another embodiment, the HSSSCCs of the present invention have a water solubility of less than 0.5% at 35° C. In another embodiment, the HSSSCCs of the present invention have a water solubility of less than 0.25% at 35° C. In another embodiment, the HSSSCCs of the present invention have a water solubility of less than 0.1% at 35° C. In another embodiment, the HSSSCCs of the present invention have a water solubility of less than 0.01% at 35° C. In an embodiment, the HSSSCCs of the present invention have a DS of at least 0.75. In an embodiment, the HSSSCCs of the present invention have a DS of at least 1.0. In an embodiment, the HSSSCCs of the present invention have a DS of at least 1.25. In an embodiment, the HSSSCCs of the present invention have a DS of at least 1.5. In an embodiment, the HSSSCCs of the present invention have a DS of at least 1.75. In an embodiment, the HSSSCCs of the present invention have a DS of at least 2.0. In an embodiment, the HSSSCCs of the present invention have a DS of at least 2.25. In an embodiment, the HSSSCCs of the present invention have a DS of at least 2.5. The chemical synthesis of HSSSCCs suitable for use in the present invention may generally follow the process disclosed in "Synthesis and Characterization of Starch Acetates with High Substitution" (Yixiang Xu, Cereal Chemistry, 81(6):735-740, 2004) which is incorporated by reference herein. Synthesis of HSSSCCs other than starch acetate may be accomplished by substituting the corresponding short chain alkyl anhydride for acetic anhydride in the synthesis.

For purposes of the present invention, a starch short chain carboxylate means a carboxylic acid moiety which is substituted onto a starch through an ester linkage. Thus, a short chain carboxylate may be illustrated as an ester of an RC(O)O— group in which R is hydrogen or a linear or branched alkyl group containing 1 to 6 carbon atoms or an alkenyl group containing 2 to 6 carbon atoms. Suitable alkyl groups include methyl, ethyl, propyl, isopropyl, butyl, isobutyl, pentyl, and hexyl and mixtures thereof. Suitable alkenyl groups include ethenyl, propenyl, isopropenyl, butenyl, isobutenyl, pentyenl, and hexenyl and mixtures thereof. In the case where R is hydrogen, the HSSSCC is starch formate. Another example of an HSSSCC is starch acetate in which acetate groups ($CH_3C(O)O—$) are substituted for at least some of the hydroxyl groups (—OH) on the starch to form an ester. Thus HSSSCC's include formate, acetate, propionate, isopropionate, butyrate, isobutyrate, pentanoate and hexanoate of starch, and the like. In some embodiments, the HSSSCC may contain a mixture of alkyl and/or alkenyl and/or formyl groups having 1 to 7 carbon atoms or 2 to 7 carbon atoms or 2 to 6 carbon atoms or 2 to 4 carbon atoms or 3 to 4 carbon atoms or 3 to 5 carbon atoms or 4 to 6 carbon atoms. Preferably, the carboxylates are alkanoates which contain alkyl groups containing 1 to 6 carbon atoms. A preferable starch short chain alkanoate is starch acetate.

In some embodiments, the HSSSCCs of the present invention may be substituted with both short chain (i.e. $C_1$-$C_7$) and longer chain ($C_8$-$C_{22}$) carboxylates. In such embodiments, the overall degree of substitution will still be at least 0.75, with the DS of the short chain carboxylates being at least 0.10. The longer chain alkaonates may comprise 8 to 22 total carbon atoms or 12 to 18 total carbon atoms, such as stearates, laurates, plamitates and other fatty acid esters. In some embodiments in which both short and longer chain carboxylates are present, the overall DS will be at least 1.0 or at least 1.25 or at least 1.50 or at least 1.75 or at least 2.00 or at least 2.25 or at least 2.50 or at least 2.75. In some embodiments in which both short and longer chain carboxylates are present, the short chain carboxylates will account for at least 10% of the total substitutions or at least 25% of the total substitutions or at least 50% of the total substitutions or at least 75% of the total substitutions with the proviso that the short chain carboxylates will constitute a DS of at least 0.10 in all cases.

There are several ways in which to produce the mixed carboxylate substituted starches of the present invention, whether mixed short chains or mixed short and longer chain carboxylates. For example, the starch may be reacted with reagents (e.g. alkyl anhydrides) of mixed chain length either simultaneously or sequentially. In general, any chemical process which produces the described HSSSCCs will be acceptable.

Starches of varying molecular weights and amylose content may be used to prepare the HSSSCCs of the present invention. In another embodiment, corn (maize) starch is used to prepare the HSSSCC. In another embodiment, a high-amylose corn (maize) starch is used to prepare the HSSSCC. It may be desirable to reduce the molecular weight of the starch to reduce the viscosity of the HSSSCC. This can be accomplished by hydrolyzing the starch through the use of acid, enzymes such as amylase of through a combination of these methods. Such hydrolysis may be carried out before or after the esterification process used to produce the HSSSCC. The extent to which the hydrolysis is carried out will depend on the starting viscosity and the desired final viscosity of the HSSSCC product.

In another embodiment, partially water soluble HSSSCCs having a DS less than about 1.5 (or less than 1.0) may be used to prepare a chewing gum of the present invention. By selecting an HSSSCC at the lower end of the inventive DS range, it is possible to prepare an HSSSCC which has a low level of water solubility which will allow the cud to dissolve very slowly during chewing. In this embodiment, the chewing gum which will gradually but completely dissolve over a period of five to 30 minutes (or more). Thus a chewing gum which does not require expectoration and disposal of a chewed cud can be produced. Even if the cud is expectorated before it completely dissolves, the cud will continue the dissolution process if exposed to precipitation or cleaned with water or water-based cleaning agents. This reduces or eliminates the nuisance of carelessly discarded gum cuds which can adhere to sidewalks, flooring and other environmental surfaces.

In other embodiments, HSSSCC gum bases, when chewed and expectorated, produce gum cuds which are biodegradable in the environment. This reduces or eliminates the aforementioned nuisance of improperly discarded gum cuds.

When used to formulate a gum base of the present invention, it may be necessary to plasticize the HSSSCC with a compatible plasticizing agent to form an elastomeric material which, when formulated as a gum base, has sufficient cohesion to be cud-forming and chewable at mouth temperatures. Plasticizers typically function to lower the $T_g$ of the HSSSCC to make the gum cud chewable at mouth temperature. Compatible plasticizers typically are also capable of decreasing the shear modulus of the HSSSCC base. Compatible plasticizing agents are water insoluble molecules of relatively low molecular weight which have a $T_g$ lower than the HSSSCC. They have a solubility parameter similar to the HSSSCC so they are capable of intimately mixing with the HSSSCC (i.e. they are miscible) and reducing the $T_g$ of the mixture to a value lower than the HSSSCC alone. Generally, any food acceptable plasticizer which functions to soften the HSSSCC and render it chewable at mouth temperature will be a compatible plasticizer. One particularly preferred plasticizer useful in the present invention is triacetin which is also known as glycerol triacetate. Triacetin has a solubility parameter of about 21 $MPa^{1/2}$ which matches the solubility parameter of starch acetate with a DS of about 2.5 In practice, highly substituted starch acetates (HSSAs) having a DS between 1.3 and 3.0 or between about 2.2 and 2.8 can be plasticized with triacetin without excessive leaching of the plasticizer from the elastomer system. Other plasticizers which may be used in the present invention include phospholipids such as lecithin and phosphatidylcholine, triglycerides of $C_4$-$C_6$ fatty acid such as glycerol trihexanoate, polyglycerol polyricinoleate, propylene glycol di-octanoate, propylene glycol di-decanoate, triglycerol penta-caprylate, triglycerol penta-caprate, decaglyceryl hexaoleate, decaglycerol decaoleate, citric acid esters of mono- or di-glycerides, polyoxyethylene sorbitan such as POE (80) sorbitan monolaurate, POE (20) sorbitan monooleate, rosin ester and polyterpene resin. Selection of an appropriate plasticizer (i.e. one with a solubility parameter similar to the HSSSCC) will depend on the specific carboxyl groups and the DS of the HSSSCC being used.

Selection of the appropriate plasticizer may also depend on the sensory properties (i.e. flavor and texture) desired for the final product. Thus different plasticizers may be selected depending on the flavoring system used in the final product.

It has been found that fats, waxes and acetylated monoglycerides can enhance the effect of the suitable plasticizers when incorporated into the gum bases of the present invention. However, fats and waxes are not suitable for use as the sole plasticizers in these compositions.

The optimal weight ratio of HSSSCC to plasticizer will vary depending on such factors as the particular HSSSCC and plasticizer selected, other components present in the gum base and chewing gum and the desired texture of the finished product. In an embodiment, the ratio of HSSSCC to plasticizer will be in the range of 1:0.5 to 1:4. In another embodiment, the ratio will be in the range of 1:1 to 1:3.5. In another embodiment, the ratio will be in the range of 1:1.5 to 1:3. In general, the appropriate plasticizer level will be effective to reduce the $T_g$ of the plasticized HSSSCC to below 37° C. or below 20° C. or below 10° C. or even below 5° C. Selection of the appropriate plasticizer from the list above, or from other sources, and selection of the appropriate usage level will be well within the capability of the chewing gum formulator using the above information as a guide.

It is preferred that the HSSSCC be preblended with the plasticizer before incorporation into the gum bases and chewing gums of the present invention. In contrast to conventional gum bases, if has been found that special processes are helpful in accomplishing this preblend. One preferred process is to blend the HSSSCC and the plasticizer in a sigma blade mixer until homogeneous and then allow the mixture to set for at least three days to allow the plasticizer to fully incorporate into the substituted starch polymer. In an embodiment, the mixture is allowed to set for at least five days. In a further embodiment, the mixture is allowed to set for at least seven days. Of course, this setting process can occur during routine shipping and storage of the ingredient. Alternatively, if immediate use of the ingredient is desired, the blended HSSSCC/plasticizer composition may be subjected to compression, for example, by feeding the blend through compression rollers.

The water-insoluble gum base of the present invention may optionally contain conventional petroleum-based elastomers and elastomer plasticizers such as styrene-butadiene rubber, butyl rubber, polyisobutylene, terpene resins and estergums. Where used, these conventional elastomers may be combined in any compatible ratio with the HSSSCC. In a preferred embodiment, significant amounts (more than 1 wt. %) of these conventional elastomers and elastomer plasticizers are not incorporated into a gum base of the present invention. In other preferred embodiments, less than 10 wt. % and preferably less than 5 wt. % of petroleum-based elastomers and elastomer plasticizers are contained in the gum base of the present invention. In some embodiments, the HSSSCCs of the present invention may be combined with medium or long chain (i.e. C12 to C22) carboxylates of starch having a high degree of substitution, such as starch laurate (DS>2.7). In such cases, the starch long chain carboxylate may act as a plasticizer for the HSSSCC. Other polymers may also act as plasticizers for the HSSSCC if they are compatible. Other ingredients which may optionally be employed include inorganic fillers such as calcium carbonate and talc, emulsifiers such as lecithin and mono- and di-glycerides, plastic resins such as polyvinyl acetate, polyvinyl laurate, and vinylacetate/vinyl laurate copolymers, colors and antioxidants.

The water-insoluble gum base of the present invention may constitute from about 5 to about 95% by weight of the chewing gum. More typically it may constitute from about 10 to about 50% by weight of the chewing gum and, in various preferred embodiments, may constitute from about 20 to about 35% by weight of the chewing gum.

In various embodiments, a chewing gum base of the present invention typically contains at least 10 wt. %, more typically at least 20 wt. %, and preferably at least 25 wt. % HSSSCC. Also typically such a gum base contains up to 60 wt. % HSSSCC, more typically up to 50 wt. %, and preferably up to 40 wt. % HSSSCC. In an embodiment, the gum base of the present invention contains between 10 and 60% HSSSCC.

A typical gum base useful in this invention includes about 7 to 100 wt. % plasticized HSSSCC elastomer, 0 to 20 wt. % synthetic elastomer, 0 to 20 wt. % natural elastomer, about 0 to about 40% by weight elastomer plasticizer, about 0 to about 35 wt. % filler, about 0 to about 35 wt. % softener, and optional minor amounts (e.g., about 1 wt. % or less) of miscellaneous ingredients such as colorants, antioxidants, and the like.

Further, a typical gum base includes at least 5 wt. % and more typically at least 10 wt. % softener and includes up to 35 wt. % and more typically up to 30 wt. % softener. Still further, a typical gum base includes at least 5 wt. % and more typically at least 15 wt. % hydrophilic modifier and includes up to 40 wt. % and more typically up to 30 wt. % of a hydrophilic modifier such as polyvinylacetate. Minor amounts (e.g., up to about 1 wt. %) of miscellaneous ingredients such as colorants, antioxidants, and the like also may be included into such a gum base.

In an embodiment, a chewing gum base of the present invention contains about 4 to about 35 weight percent filler, about 5 to about 35 weight percent softener, about 5 to about 40% hydrophilic modifier and optional minor amounts (about one percent or less) of miscellaneous ingredients such as colorants, antioxidants, and the like.

Additional elastomers may include, but are not limited to, polyisobutylene with a viscosity average molecular weight of about 100,000 to about 800,000, isobutylene-isoprene copolymer (butyl elastomer), styrene-butadiene copolymers having styrene-butadiene ratios of about 1:3 to about 3:1 and/or polyisoprene content of about 5 to about 50 percent by weight of the gum base, and combinations thereof. Natural elastomers which may be similarly incorporated into the gum bases of the present inventions include jelutong, lechi caspi, perillo, sorva, massaranduba balata, massaranduba chocolate, nispero, rosindinha, chicle, gutta hang kang, and combinations thereof.

The elastomer component of gum bases used in this invention may contain up to 100 wt. % plasticized HSSSCC. Alternatively, mixtures of plasticized HSSSCCs with other elastomers also may be used in accordance with this invention, including elastomeric components of gum bases containing at least 10 wt. % plasticized HSSSCC, typically at least 30 wt. % and preferably at least 50 wt. % of the elastomeric component. A typical elastomeric component contains between 50 to 100 wt. % plasticized HSSSCC and preferably 75 to 100 wt. % plasticized HSSSCC. A gum base with a elastomer component containing 75 to 90 wt. % or 90 to 100 wt. % plasticized HSSSCC also is useful.

A typical gum base containing HSSSCCs made according to the present invention, when chewed, will produce a cud having has a complex modulus (a measure of overall firmness or resistance to mechanical force) of 1 to 800 kPa at 40° C. (measured on a Rheometric Dynamic Analyzer with dynamic temperature steps, 0-100° C. at 3° C./min; parallel plate; 0.5% strain; 10 rad/s). A preferred HSSSCC-containing gum base made according to the present invention will produce a cud having a complex modulus of 10 to 500 kPa and still more preferably between 100 and 200 kPa. A plasticized HSSSCC suitable for use in a chewing gum base should be sufficiently pliable at typical mouth temperatures (e.g., 35-40° C.) to give good mouthfeel.

A suitable HSSSCC used in this invention typically should be essentially without taste and have an ability to incorporate flavor materials which provide a consumer-acceptable flavor sensation. HSSSCCs are nontoxic and food acceptable and therefore capable of being food approved by government regulatory agencies. Furthermore, they can be prepared using only food safe reagents and solvents.

Typically, the HSSSCCs of the present invention have sufficient cohesion such that a chewing gum composition containing such material retains cohesion during the chewing process and forms a discrete gum cud.

Elastomer plasticizers commonly used for petroleum-based elastomers may be optionally used in this invention including but are not limited to, natural rosin esters, often called estergums, such as glycerol esters of partially hydrogenated rosin, glycerol esters of polymerized rosin, glycerol esters of partially or fully dimerized rosin, glycerol esters of rosin, pentaerythritol esters of partially hydrogenated rosin, methyl and partially hydrogenated methyl esters of rosin, pentaerythritol esters of rosin, glycerol esters of wood rosin, glycerol esters of gum rosin; synthetics such as terpene resins derived from alpha-pinene, beta-pinene, and/or d-limonene; and any suitable combinations of the foregoing. The preferred elastomer plasticizers also will vary depending on the specific application, and on the type of elastomer which is used.

In addition to natural rosin esters, also called resins, elastomer plasticizers may include other types of plastic resins. These include polyvinyl acetate having a GPC weight average molecular weight of about 2,000 to about 90,000, polyisoprene, polyethylene, vinyl acetate-vinyl laurate copolymer having vinyl laurate content of about 5 to about 50 percent by weight of the copolymer, and combinations thereof. Preferred weight average molecular weights (by GPC) for polyisoprene are 50,000 to 80,000 and for polyvinyl acetate are 10,000 to 65,000 (with higher molecular weight polyvinyl acetates typically used in bubble gum base). For vinyl acetate-vinyl laurate, vinyl laurate content of 10-45 percent by weight of the copolymer is preferred. Preferably, a gum base contains a plastic resin in addition to other materials functioning as elastomer plasticizers.

Additionally, a gum base may include fillers/texturizers and softeners/emulsifiers. Softeners (including emulsifiers) are added to chewing gum in order to optimize the chewability and mouth feel of the gum.

Softeners/emulsifiers that typically are used include tallow, hydrogenated tallow, hydrogenated and partially hydrogenated vegetable oils, cocoa butter, mono- and di-glycerides such as glycerol monostearate, glycerol triacetate, lecithin, paraffin wax, microcrystalline wax, natural waxes and combinations thereof. Lecithin and mono- and di-glycerides also function as emulsifiers to improve compatibility of the various gum base components.

Fillers/texturizers typically are inorganic, water-insoluble powders such as magnesium and calcium carbonate, ground limestone, silicate types such as magnesium and aluminum silicate, clay, alumina, talc, titanium oxide, mono-, di- and tri-calcium phosphate and calcium sulfate. Insoluble organic fillers including cellulose polymers such as wood as well as combinations of any of these also may be used.

Selection of various components in chewing gum bases or chewing gum formulations of this invention typically are dictated by factors, including for example the desired properties (e.g., physical (mouthfeel), taste, odor, and the like) and/or applicable regulatory requirements (e.g., in order to have a food grade product, food grade components, such as food grade approved oils like vegetable oil, may be used.)

Colorants and whiteners may include FD&C-type dyes and lakes, fruit and vegetable extracts, titanium dioxide, and combinations thereof.

Antioxidants such as BHA, BHT, tocopherols, propyl gallate and other food acceptable antioxidants may be employed to prevent oxidation of fats, oils and elastomers in the gum base.

As noted, the base may include wax or be wax-free. An example of a wax-free gum base is disclosed in U.S. Pat. No. 5,286,500, the disclosure of which is incorporated herein by reference.

A water-insoluble gum base typically constitutes approximately 5 to about 95 percent, by weight, of a chewing gum of this invention; more commonly, the gum base comprises 10 to about 50 percent of a chewing gum of this invention; and in some preferred embodiments, 20 to about 35 percent, by weight, of such a chewing gum.

In addition to a water-insoluble gum base portion, a typical chewing gum composition includes a water-soluble bulk portion (or bulking agent) and one or more flavoring agents. The water-soluble portion can include high intensity sweeteners, binders, flavoring agents, water-soluble softeners, gum emulsifiers, colorants, acidulants, fillers, antioxidants, and other components that provide desired attributes.

Water-soluble softeners, which may also known as water-soluble plasticizers and plasticizing agents, generally constitute between approximately 0.5 to about 15% by weight of the chewing gum. Water-soluble softeners may include glycerin, lecithin, and combinations thereof. Aqueous sweetener solutions such as those containing sorbitol, hydrogenated starch hydrolysates (HSH), corn syrup and combinations thereof, may also be used as softeners and binding agents (binders) in chewing gum.

Preferably, a bulking agent or bulk sweetener will be useful in chewing gums of this invention to provide sweetness, bulk and texture to the product. Typical bulking agents include sugars, sugar alcohols, and combinations thereof. Bulking agents typically constitute from about 5 to about 95% by weight of the chewing gum, more typically from about 20 to about 80% by weight and, still more typically, from about 30 to about 70% by weight of the gum. Sugar bulking agents generally include saccharide-containing components commonly known in the chewing gum art, including, but not limited to, sucrose, dextrose, maltose, dextrin, dried invert sugar, fructose, levulose, galactose, corn syrup solids, and the like, alone or in combination. In sugarless gums, sugar alcohols such as sorbitol, maltitol, erythritol, isomalt, mannitol, xylitol and combinations thereof are substituted for sugar bulking agents. Combinations of sugar and sugarless bulking agents may also be used.

In addition to the above bulk sweeteners, chewing gums typically comprise a binder/softener in the form of a syrup or high-solids solution of sugars and/or sugar alcohols. In the case of sugar gums, corn syrups and other dextrose syrups (which contain dextrose and significant amounts higher saccharides) are most commonly employed. These include syrups of various DE levels including high-maltose syrups and high fructose syrups. In the case of sugarless products, solutions of sugar alcohols including sorbitol solutions and hydrogenated starch hydrolysate syrups are commonly used. Also useful are syrups such as those disclosed in U.S. Pat. No. 5,651,936 and US 2004-234648 which are incorporated herein by reference. Such syrups serve to soften the initial chew of the product, reduce crumbliness and brittleness and increase flexibility in stick and tab products. They may also control moisture gain or loss and provide a degree of sweetness depending on the particular syrup employed.

High intensity artificial sweeteners can also be used in combination with the above-described sweeteners. Preferred sweeteners include, but are not limited to sucralose, aspartame, salts of acesulfame, alitame, neotame, saccharin and its salts, cyclamic acid and its salts, glycyrrhizin, stevia, dihydrochalcones, thaumatin, monellin, and the like, alone or in combination. In order to provide longer lasting sweetness and flavor perception, it may be desirable to encapsulate or otherwise control the release of at least a portion of the artificial sweetener. Such techniques as wet granulation, wax granulation, spray drying, spray chilling, fluid bed coating, coacervation, and fiber extrusion may be used to achieve the desired release characteristics.

Usage level of the artificial sweetener will vary greatly and will depend on such factors as potency of the sweetener, rate of release, desired sweetness of the product, level and type of flavor used and cost considerations. Thus, the active level of artificial sweetener may vary from 0.02 to about 8% by weight. When carriers used for encapsulation are included, the usage level of the encapsulated sweetener will be proportionately higher.

Combinations of sugar and/or sugarless sweeteners may be used in chewing gum. Additionally, the softener may also provide additional sweetness such as with aqueous sugar or alditol solutions.

If a low calorie gum is desired, a low caloric bulking agent can be used. Examples of low caloric bulking agents include: polydextrose; Raftilose, Raftilin; fructooligosaccharides (NutraFlora); Palatinose oligosaccharide; Guar Gum Hydrolysate (Sun Fiber); or indigestible dextrin (Fibersol). However, other low calorie bulking agents can be used. In addition, the caloric content of a chewing gum can be reduced by increasing the relative level of gum base while reducing the level of caloric sweeteners in the product. This can be done with or without an accompanying decrease in piece weight.

A variety of flavoring agents can be used. The flavor can be used in amounts of approximately 0.1 to about 15 weight percent of the gum, and preferably, about 0.2 to about 5%. Flavoring agents may include essential oils, synthetic flavors or mixtures thereof including, but not limited to, oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion. Sensate components which impart a perceived tingling or thermal response while chewing, such as a cooling or heating effect, also may be included. Such components include cyclic and acyclic carboxamides, menthol derivatives, and capsaicin among others. Acidulants may be included to impart tartness.

The present invention may be used with a variety of processes for manufacturing chewing gum.

Chewing gum bases of the present invention may be easily prepared by combining the HSSSCC with a compatible plasticizer as previously disclosed. If additional ingredients such as softeners, plastic resins, emulsifiers, fillers, colors and antioxidants are desired, they may be added by conventional batch mixing processes or continuous mixing processes. Process temperatures are generally from about 120° C. to about 180° C. in the case of a batch process. If it is desired to combine the plasticized HSSSCC with conventional elastomers, it is preferred that the conventional elastomers be formulated into a conventional gum base before combining with the HSSSCC gum base. To produce the conventional gum base, the elastomers are first ground or shredded along with filler. Then the ground elastomer is transferred to a batch mixer for compounding. Essentially any standard, commercially available mixer known in the art (e.g., a Sigma blade mixer) may be used for this purpose. The first step of the mixing process is called compounding. Compounding involves combining the ground elastomer with filler and elastomer plasticizer (elastomer solvent). This compounding step generally requires long mixing times (30 to 70 minutes) to produce a homogeneous mixture. After compounding, additional filler and elastomer plasticizer are added followed by PVAc and finally softeners while mixing to homogeneity after each added ingredient. Minor ingredients such as antioxidants and color may be added at any time in the process. The conventional base is then blended with the HSSSCC base in the desired ratio. Whether HSSSCC is used alone or in combination with conventional elastomers, the completed base is then extruded or cast into any desirable shape (e.g., pellets, sheets or slabs) and allowed to cool and solidify.

Alternatively, continuous processes using mixing extruders, which are generally known in the art, may be used to prepare the gum base. In a typical continuous mixing process, initial ingredients (including ground elastomer, if used) are metered continuously into extruder ports various points along the length of the extruder corresponding to the batch processing sequence. After the initial ingredients have massed homogeneously and have been sufficiently compounded, the balance of the base ingredients are metered into ports or injected at various points along the length of the extruder. Typically, any remainder of elastomer component or other components are added after the initial compounding stage. The composition is then further processed to produce a homogeneous mass before discharging from the extruder outlet. Typically, the transit time through the extruder will be substantially less than an hour. If the gum base is prepared from HSSSCC without conventional elastomers, the necessary length of the extruder needed to produce a homogeneous gum base will be greatly reduced with a corresponding reduction in transit time. In addition, the HSSSCC need not be pre-ground before addition to the extruder. It is only necessary to ensure that the HSSSCC is reasonably free-flowing to allow controlled, metered feeding into the extruder inlet port.

Exemplary methods of extrusion, which may optionally be used in accordance with the present invention, include the following, the entire contents of each being incorporated herein by reference: (i) U.S. Pat. No. 6,238,710, claims a method for continuous chewing gum base manufacturing, which entails compounding all ingredients in a single extruder; (ii) U.S. Pat. No. 6,086,925 discloses the manufacture of chewing gum base by adding a hard elastomer, a filler and a lubricating agent to a continuous mixer; (iii) U.S. Pat. No. 5,419,919 discloses continuous gum base manufacture using a paddle mixer by selectively feeding different ingredients at different locations on the mixer; and, (iv) yet another U.S. Pat. No. 5,397,580 discloses continuous gum base manufacture wherein two continuous mixers are arranged in series and the blend from the first continuous mixer is continuously added to the second extruder.

Chewing gum is generally manufactured by sequentially adding the various chewing gum ingredients to commercially available mixers known in the art. After the ingredients have been thoroughly mixed, the chewing gum mass is discharged from the mixer and shaped into the desired form, such as by rolling into sheets and cutting into sticks, tabs or pellets or by extruding and cutting into chunks.

Generally, the ingredients are mixed by first melting the gum base and adding it to the running mixer. The gum base may alternatively be melted in the mixer. Color and emulsifiers may be added at this time.

A chewing gum softener such as glycerin can be added next along with part of the bulk portion. Further parts of the bulk portion may then be added to the mixer. Flavoring agents are typically added with the final part of the bulk portion. The entire mixing process typically takes from about five to about fifteen minutes, although longer mixing times are sometimes required.

In yet another alternative, it may be possible to prepare the gum base and chewing gum in a single high-efficiency extruder as disclosed in U.S. Pat. No. 5,543,160. Chewing gums of the present invention may be prepared by a continuous process comprising the steps of: a) adding gum base ingredients into a high efficiency continuous mixer; b) mixing the ingredients to produce a homogeneous gum base, c) adding at least one sweetener and at least one flavor into the continuous mixer, and mixing the sweetener and flavor with the remaining ingredients to form a chewing gum product; and d) discharging the mixed chewing gum mass from the single high efficiency continuous mixer. In the present invention, it may be necessary to first blend the HSSSCC with a compatible plasticizer and subject the blend to a compression step before incorporation of additional gum base or chewing gum ingredients. This blending and compression process may occur inside the high-efficiency extruder or may be performed externally prior to addition of the plasticized HSSSCC composition to the extruder.

Of course, many variations on the basic gum base and chewing gum mixing processes are possible.

EXAMPLES

The following examples of the invention and comparative run illustrate, but do not limit the invention described and claimed. Amounts listed are in weight percent.

Two samples of Highly Substituted Starch Acetate (HSSA) prepared from high-amylose maize starch having degrees of substitution (DS) of 2.3 and 2.8 were obtained from Milford A Hanna of the Industrial Agricultural Products Center and Department of Food Science & Technology, University of Nebraska, Lincoln Nebr. 68583-0730. Gum bases were prepared by blending HSSA (DS=2.8) with triacetin in a sigma blade mixer and allowing the mixture to set for approximately seven days after which additional softeners were incorporated into the plasticized HSSA, again using the sigma blade mixer. Two gum bases were made according to the formulas in Table 1.

TABLE 1

| Ingredient | Example 1 | Example 2 |
|---|---|---|
| HSSA (DS = 2.8) | 28.7 | 33.7 |
| Triacetin | 42.8 | 37.8 |
| Hydrogenated Soybean Oil | 23.8 | 23.8 |
| Acetylated Monoglyceride | 4.7 | 4.7 |
| Total | 100.0 | 100.0 |

The two HSSA bases along with a commercial chewing gum base were used to prepare chewing gums according to the formulas in Table 2.

TABLE 2

| Ingredient | Example 3 (Inventive) | Example 4 (Inventive) | Example 5 (Comparative) |
|---|---|---|---|
| Gum base of Example 1 | 32.0 | — | — |
| Gum base of Example 1 | — | 32.0 | — |
| Commercial Gum Base | — | — | 32.0 |
| Sorbitol | 45.0 | 45.0 | 45.0 |
| Spearmint Flavor | 1.0 | 1.0 | 1.0 |
| Glycerin | 3.5 | 3.5 | 3.5 |
| Aspartame | 0.5 | 0.5 | 0.50 |

TABLE 2-continued

| Ingredient | Example 3 (Inventive) | Example 4 (Inventive) | Example 5 (Comparative) |
|---|---|---|---|
| Hydrogenated Starch Hydrolysate (85% solution) | 15.0 | 15.0 | 15.0 |
| Mannitol | 3.0 | 3.0 | 3.0 |
| Total | 100.0 | 100.0 | 100.0 |

The chewing gums of Examples 3-5 were subjected to a water extraction process to simulate removal of water soluble components which occurs during normal chewing of gum. Approximately 6 g of gum was placed in a 250 ml beaker along with 200 ml of water. The flask was then placed in an ultrasonic bath filled with distilled water at 37° C. for 60 minutes. After sonication, the water was poured off and the gum cud was kneaded by hand under running water for one minute. The cud is then flattened into a disk shape approximately 2 mm thick. After the extraction process, the cuds were subjected to rheological testing using a Rheometrics Dynamic Analyzer (RDA III). The instrument was set up with parallel plates (25 mm diameter), Dyn Strain Frequency Sweep test with strain set to 0.5% and 10% at 37° C. over the rande of 0.1 to 100 rad/s. The results are shown in FIGS. 1 and 2.

It can be seen from these results that the HSSSCC gum bases of Examples 1 and 2 have rheological properties similar to a commercial gum base. Previous testing has shown a correlation between these rheological properties and sensory evaluation of chewing gum texture. Furthermore, the data is consistent with formation of a gum cud which is chewable at mouth temperature.

An HSSA gum base (Example 6) was prepared by treating the previously obtained HSSA (DS=2.8) with 1.0 wt. % lipase (Fungal lipase 8000 obtained from DSM Valley Research, Inc., South Bend Ind. US) at pH 8 at 35° C. for 12 hours to reduce the DS to 1.97. (This was done as an expedient measure. No advantage is seen to this method versus substituting the starch to the same degree through an esterification process.) The HSSA (DS=1.97) was then plasticized by blending 4 parts of the HSSA with 6 parts of triacetin to produce a plasticized HSSA (DS=1.97) which was then incorporated into a gum base according to the formula in Table 3.

TABLE 3

| | Example 6 |
|---|---|
| Starch Laurate (DS = 3) | 56.47 |
| HSSA (DS = 1.97) | 10.00 |
| TRIACETIN | 15 |
| Calcium Carbonate | 11.25 |
| Mono- and di-glycerides | 2.60 |
| Hydrogenated Veg. Oil | 4.68 |
| Total | 100.00 |

A chewing gum (Example 7 was prepared from the base of Example 6 according to the formula in Table 4.

TABLE 4

| | Example 7 |
|---|---|
| Gum Base of Ex. 6 | 34.86 |
| Sorbitol | 44.69 |
| Mannitol | 2.24 |
| Calcium Carbonate | 1.38 |

TABLE 4-continued

|  | Example 7 |
| --- | --- |
| Glycerin | 3.19 |
| Peppermint Flavor | 2.06 |
| Water | 0.24 |
| Encapsulated High Intensity Sweeteners | 0.14 |
| Hydrogenated Starch Hydrolysate (85% solution) | 11.20 |
| Total | 100.00 |

The chewing gum of Example 7 was evaluated in a 60 minute chew. The cud had a pleasant, soft chew with firmness and mouthfeel similar to a commercial chewing gum but with slightly less bounce. The rheological properties of the cud were within the range of those for current commercial chewing gum products.

An HSSSCC suitable for use in a gum base (Example 8) can be prepared by esterifying corn starch with acetic anhydride and lauroyl chloride to DS=0.35 acetate and DS=1.95 laurate (total DS 2.30) then treating the HSSSCC with amylase to reduce its Brookfield viscosity to 81 cps at 25° C.

What is claimed is:

1. A chewing gum comprising a water soluble bulking agent, a flavor, and a chewing gum base which is cud-forming and chewable at mouth temperature, the chewing gum base comprising a highly substituted starch short chain carboxylate ester of an RC(O)O— group in which R is hydrogen or a linear or branched alkyl group containing 1 to 6 carbon atoms or an alkenyl group containing 2 to 6 carbon atoms, wherein the highly substituted starch short chain carboxylate has an overall degree of substitution of a carboxylate ester of at least 0.75.

2. A chewing gum of claim 1 in which the highly substituted starch short chain carboxylate is plasticized with a compatible plasticizer.

3. A chewing gum of claim 2 wherein the plasticizer is selected from the group consisting of triacetin, phospholipids, triglycerides of $C_4$-$C_6$ fatty acid, glycerol trihexanoate, polyglycerol polyricinoleate, propylene glycol dioctanoate, propylene glycol didecanoate), triglycerol pentacaprylate, triglycerol pentacaprate, decaoglyceryl hexaoleate, decaglycerol decaoleate, citric acid esters of mono- and di-glycerides, polyoxyethylene sorbitans, POE (80), sorbitan monolaurate, POE (20) sorbitan monooleate, rosin ester, polyterpene, and mixtures thereof.

4. A chewing gum of claim 3 wherein the plasticizer is triacetin.

5. A chewing gum of claim 1 in which the carboxylate is an alkanoate.

6. A chewing gum of claim 2 wherein the weight ratio of highly substituted starch short chain carboxylate to plasticizer is between 1:0.5 and 1:4.

7. A chewing gum of claim 1 in which the highly substituted starch short chain carboxylate has a degree of substitution of at least 2.0.

8. A chewing gum of claim 1 wherein the carboxylate contains substituted aliphatic carboxylic acid moieties containing alkyl groups having 1 to 6 carbon atoms.

9. A chewing gum of claim 1 wherein the highly substituted starch short chain carboxylate ester is starch acetate.

10. A chewing gum of claim 1 wherein the carboxylate contains substituted aliphatic carboxylic acid moieties containing at least two different alkyl groups having 1 to 6 carbon atoms.

11. A chewing gum of claim 1 wherein the highly substituted starch short chain carboxylate further contains substituted aliphatic carboxylic acid moieties containing alkyl groups having at least 8 carbon atoms, wherein at least 10% of the substituted carboxylic acid moieties contain hydrogen or alkyl groups having 1 to 6 carbon atoms or alkenyl groups having 2 to 6 carbon atoms.

12. A chewing gum of claim 11 wherein the at least one longer chain alkyl group contains 8 to 22 carbon atoms.

13. A chewing gum of claim 11 wherein the at least one longer chain alkyl group contains 12 to 18 carbon atoms.

14. A chewing gum of claim 1 wherein the highly substituted starch short chain carboxylate is hydrolyzed.

15. A chewing gum of claim 1 in which the highly substituted starch short chain carboxylate has a degree of substitution of at least 1.5.

16. A chewing gum of claim 1 in which the highly substituted starch short chain carboxylate has a degree of substitution of at least 1.0.

17. A chewing gum of claim 1 in which the highly substituted starch short chain carboxylate has a degree of substitution of at least 1.25.

18. A chewing gum comprising a water soluble bulking agent, a flavor, and a chewing gum base which is cud-forming and chewable at mouth temperature, the chewing gum base comprising a highly substituted starch short chain carboxylate comprising an ester of an RC(O)O— group in which R is hydrogen or a linear or branched alkyl group containing 1 to 6 carbon atoms or an alkenyl group containing 2 to 6 carbon atoms, wherein the highly substituted starch short chain carboxylate is prepared by a process comprising reacting unmodified starch with a monofunctional carboxylic acid or its anhydride, a vinyl alkanoate, or a fatty acid chloride.

19. A chewing gum of claim 18 in which the highly substituted starch short chain carboxylate has a degree of substitution of at least 0.75.

20. A chewing gum of claim 18 in which the highly substituted starch short chain carboxylate has a degree of substitution of at least 1.0.

21. A chewing gum of claim 18 in which the highly substituted starch short chain carboxylate has a degree of substitution of at least 1.25.

* * * * *